United States Patent [19]

Hara et al.

[11] Patent Number: 5,093,057

[45] Date of Patent: Mar. 3, 1992

[54] CLUTCH DRIVEN PLATES AND METHOD OF PRODUCING THE SAME

[75] Inventors: Yasuhiro Hara, Shimodate; Mitsuhiro Inoue, Oyama; Hideo Baba, Shimodate; Tadashi Okazaki, Oomiya; Shigeru Kudo, Katsuta, all of Japan

[73] Assignee: Hitachi, Chemical Co., Tokyo, Japan

[21] Appl. No.: 641,858

[22] Filed: Jan. 16, 1991

Related U.S. Application Data

[62] Division of Ser. No. 430,248, Nov. 2, 1989, Pat. No. 5,004,089.

[30] Foreign Application Priority Data

| Nov. 22, 1988 | [JP] | Japan | 63-295738 |
| Jan. 20, 1989 | [JP] | Japan | 1-12075 |
| Jan. 20, 1989 | [JP] | Japan | 1-12076 |
| Jul. 26, 1989 | [JP] | Japan | 1-193392 |
| Jul. 26, 1989 | [JP] | Japan | 1-193393 |

[51] Int. Cl.$^5$ ............................ B29C 43/30
[52] U.S. Cl. ......................... 264/112; 156/245; 523/149
[58] Field of Search ....... 264/112, 118, 119, DIG. 57; 523/149, 152; 156/245

[56] References Cited

U.S. PATENT DOCUMENTS

| 1,557,670 | 10/1925 | De France | 264/112 |
| 1,626,403 | 4/1927 | Gatke . | |
| 1,746,110 | 2/1930 | Evans . | |
| 1,833,414 | 11/1931 | Cram | 192/107 R |
| 2,559,747 | 7/1951 | Batchelor et al. | 264/119 |
| 2,724,671 | 11/1955 | Lombardy | 192/107 M |
| 2,927,673 | 3/1960 | Sand . | |
| 3,073,424 | 1/1963 | Russel . | |
| 3,130,172 | 4/1964 | Harvey et al. | 523/152 |
| 3,534,842 | 10/1970 | Davison | 192/107 R |
| 3,841,949 | 10/1974 | Black | 192/107 M |
| 3,998,573 | 12/1976 | Gilbert et al. | 425/117 |
| 4,197,352 | 4/1980 | Emmett et al. | 156/245 |
| 4,260,047 | 4/1981 | Nels | 264/118 |
| 4,262,788 | 4/1981 | Yamamoto et al. | 192/107 M |
| 4,385,682 | 5/1983 | Yamamoto et al. | 192/107 M |
| 4,418,115 | 11/1983 | Le Lannou | 192/107 M |
| 4,617,165 | 10/1986 | Tsang et al. | 264/236 |
| 4,667,534 | 5/1987 | Kataoka | 192/107 R |
| 4,835,013 | 5/1989 | Heck et al. | 156/245 |
| 4,968,468 | 11/1990 | Leinweber | 264/113 |

FOREIGN PATENT DOCUMENTS

| 395240 | 4/1933 | Belgium . |
| 1575906 | 11/1970 | Fed. Rep. of Germany . |
| 966920 | 10/1950 | France . |
| 61-41022 | 2/1986 | Japan . |
| 61-70225 | 4/1986 | Japan . |
| 61-256031 | 11/1986 | Japan . |
| 1451788 | 10/1976 | United Kingdom . |

Primary Examiner—Mary Lynn Theisen
Attorney, Agent, or Firm—Antonelli, Terry, Stout & Kraus

[57] ABSTRACT

A clutch driven plate comprising a clutch facing plate molded from a clutch facing material comprising a fiber, a binder, and a friction modifier and a back-up plate carrying the clutch facing plate, wherein a number of dimples are formed on the surface of the clutch facing plate. The clutch driven plate is obtainable by thermo-compression molding a back-up plate and a clutch facing material comprising a fiber, a binder, and a friction modifier to integrate the plate and clutch facing material into one body.

4 Claims, 6 Drawing Sheets

CLUTCH DRIVEN PLATES AND METHOD OF PRODUCING THE SAME

This is a division of application Ser. No. 07/430,248, filed Nov. 2, 1989 now U.S. Pat. No. 5,004,089.

BACKGROUND OF THE INVENTION (a) Field of the Invention

The present invention relates to a clutch driven plate which may be mainly used in a dry clutch by riveting or bonding it to a clutch disc and to a method of producing the clutch driven plate.

(b) Description of the Related Art

In the conventional method of producing clutch driven plates for automobiles, a woven clutch driven plate has been produced by impregnating a fiber base material consisting of a long fiber, such as asbestos or glass fiber, with a thermosetting resin, rubber material, and other additives including friction modifier, etc., preforming the impregnated fiber base material by winding it into a torus form, thermo-compression molding the obtained torus body, and subjecting the molded product to finishing including after-curing, deflashing, abrasion, etc.

Also, as disclosed in Japanese Patent Application Kokai Koho (Laid-open) No. 61-41022 and Japanese Patent Application Kokai Koho (Laid-open) No. 61-70225, there has been known a method of producing a clutch driven plate which method comprises putting a resin-mold clutch facing plate composed of a non-woven fabric of asbestos, a thermosetting resin, and a friction modifier on a back-up plate made of a light metal such as aluminum, dulalumin, magnesium, etc., and thermo-compression molding the clutch facing plate and the back-up plate into one body. This method of producing a clutch driven plate does not include the step of impregnating a fiber base material with a bonding material and a friction modifier nor the step of preforming a tablet by winding, and therefore, this method saves time and processing fees in comparison with the method of producing a woven clutch driven plate. Further, the clutch driven plate produced by this method is generally more stable in quality than the woven clutch driven plate, and it has a higher breaking revolution speed because the back-up plate reinforces its strength.

The clutch driven plate produced by the above-described method, however, has a problem in that warping of the clutch driven plate is unavoidable because of the difference in thermal expansion coefficient between the back-up plate and the clutch facing plate and because of the curing shrinkage of the binder in the clutch facing plate.

The warped clutch driven plate has caused some inconveniences such that the rivet holes in the clutch driven plate and in a cushion spring of a dry clutch do not meet each other at the time of riveting, and that when the dry clutch employing the clutch driven plate is operated, only a part of the clutch facing plate contacts flywheel, resulting in uneven abrasion of the clutch facing plate.

Further, the clutch driven plate produced by the above method is heavier than the woven clutch driven plate, and its use in a clutch disc has caused the necessity for reinforcement of the synchro device of transmission gear.

In addition, there is another problem that because the back-up plate used for the clutch driven plate generally has a larger gravity than the clutch facing plate, the weight of the clutch driven disc is consequently increased. It results in an increase of the inertia of the clutch driven plate, and rotating the clutch driven plate inevitably requires a larger horsepower of engines.

As disclosed in Japanese Patent Application Kokai Koho (Laid-open) No. 61-256031, there has been known a clutch driven plate produced by integrally molding a center plate and a clutch facing constructed from a tape-like material and forming grooves on the surface of the clutch facing at the time of the integral molding.

The grooves formed in the above-described clutch driven plate are provided in order to exhaust the abrasion powder produced on friction thereby improving the friction efficiency. Therefore, each groove extends to both outward and inward peripheral edges of the clutch facing, and the clutch facing plate is divided by the grooves into sections. In case where the groove is deepened to make the clutch disc lighter and to reduce warp, there occurs the inconvenience that some parts of the divided clutch facing plate peel from the back-up plate, particularly, when the clutch driven plate and the flywheel do not engage uniformly against each other.

SUMMARY OF THE INVENTION

An object of the present invention is to provide a light clutch driven plate substantially free from warp.

Another object of the present invention is to provide a method of producing the clutch driven plate.

That is, the present invention provides a clutch driven plate comprising
  a clutch facing plate molded from a clutch facing material comprising a fiber, a binder, and a friction modifier and
  a back-up plate carrying the clutch facing plate, wherein a number of dimples are formed on the surface of the clutch facing plate.

The clutch driven plate of the present invention scarcely warps and is light because a number of dimples are formed on the surface of the clutch facing plate.

The present invention also provides a method of producing a clutch driven plate suitable for the production of the clutch driven plate of the present invention. The method of the present invention comprises
  producing an integral body consisting of a clutch facing plate and a back-up plate by making two layers with a back-up plate and a clutch facing material, the clutch facing material comprising a fiber, a binder, and a friction modifier, and molding the layered back-up plate and the clutch facing material by thermo-compression molding and
  forming a number of dimples on the surface of the clutch facing plate.

BRIEF DESCRIPTION OF THE INVENTION

Figure 3:
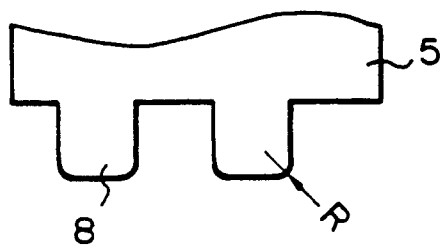
Figure 4:
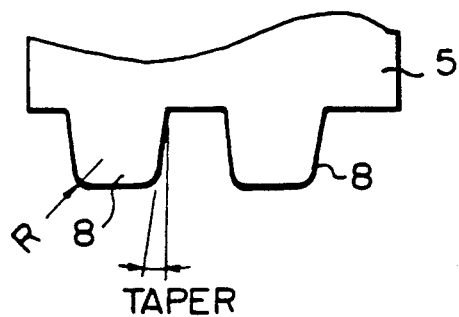

Each of FIG. 3 and FIG. 4 is a partially sectional view of a mold used for an embodiment of the method of producing a clutch driven plate according to the present invention, each figure showing the shape of the cylindrical projection.

Figure 5:
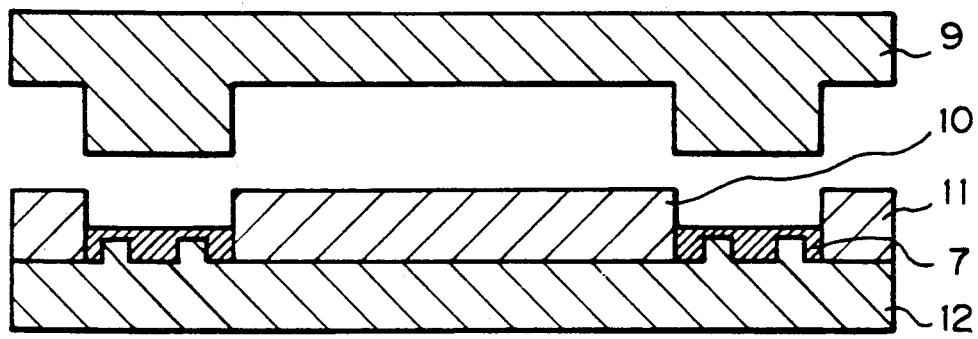
Figure 6:
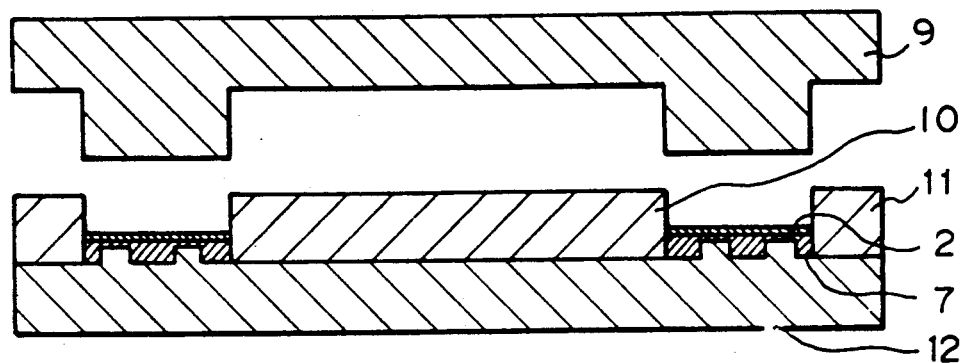

FIG. 5 and FIG. 6 are partially sectional views of a mold used for an embodiment of the method of producing a clutch driven plate according to the present invention, the figures showing the embodiment of the method according to the present invention being carried out.

Figure 7:
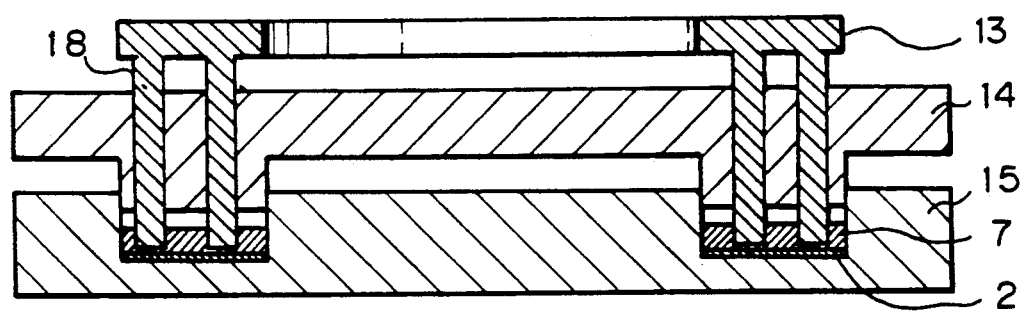
Figure 8:
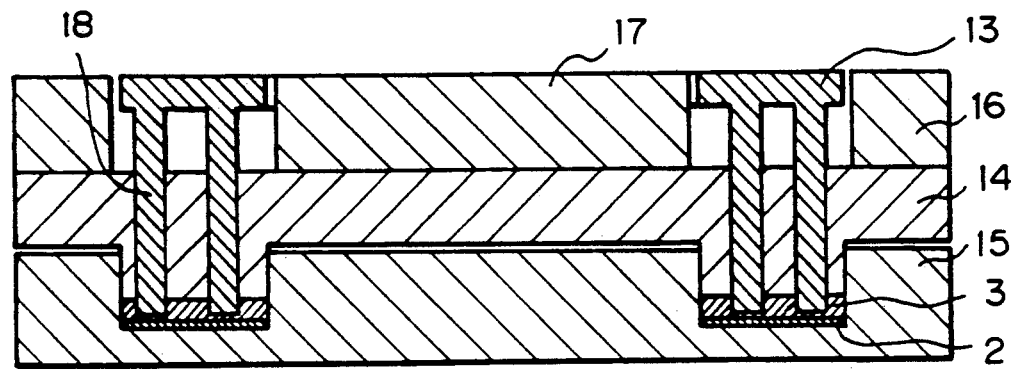

FIG. 7 and FIG. 8 are partially sectional views of a mold used for an embodiment of the method of producing a clutch driven plate according to the present invention, the figures showing the embodiment of the method according to the present invention being carried out.

Figure 9:
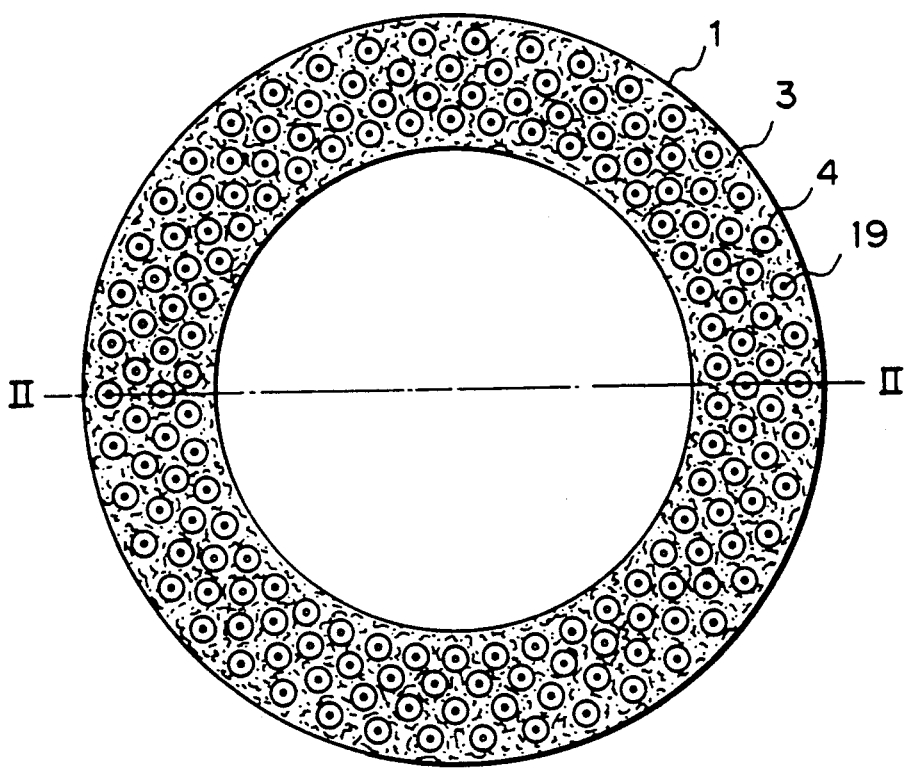

FIG. 9 is a front elevation view of an embodiment of the clutch driven plate according to the present invention.

Figure 10:
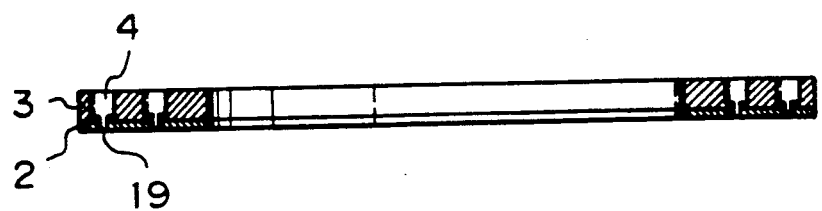

FIG. 10 is a sectional view on the line II—II of FIG. 9.

Figure 11:
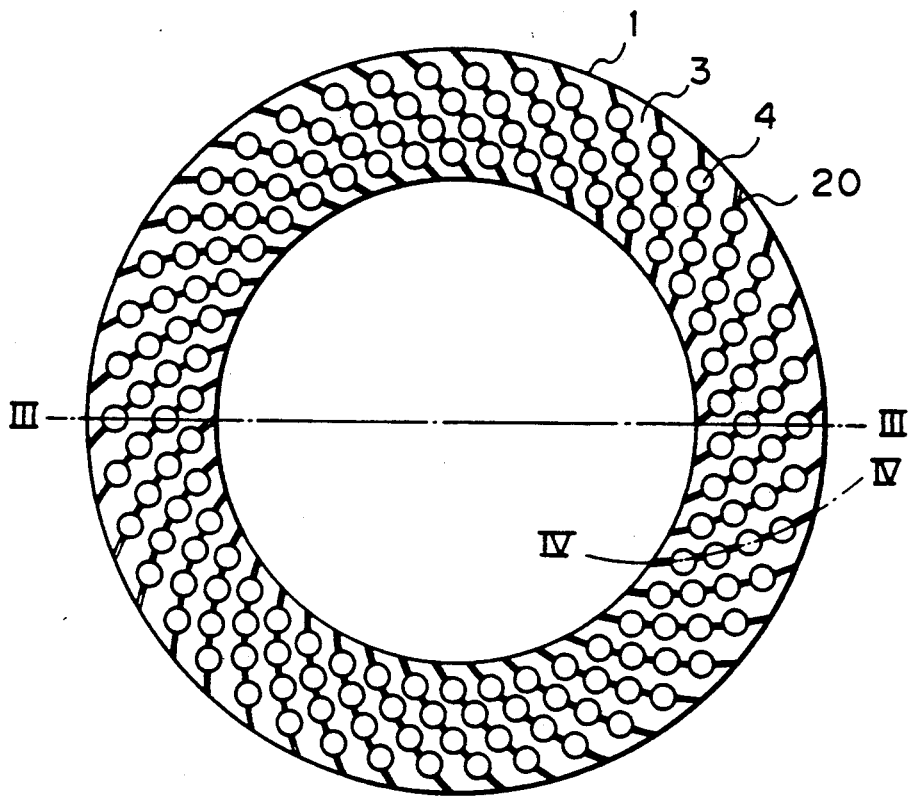

FIG. 11 is a front elevation view of an embodiment of the clutch driven plate according to the present invention.

Figure 12:
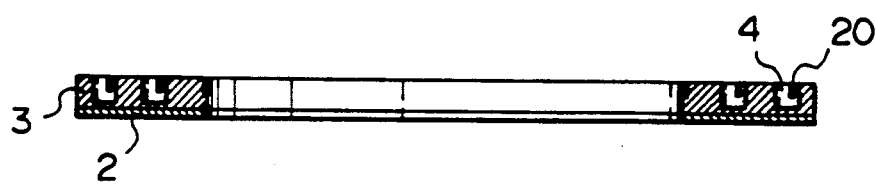

FIG. 12 is a sectional view on the line III—III of FIG. 11.

Figure 13:
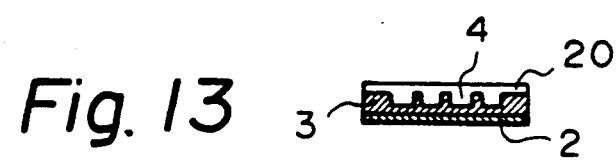

FIG. 13 is a partially sectional view on the line IV—IV of FIG. 11.

Figure 14:
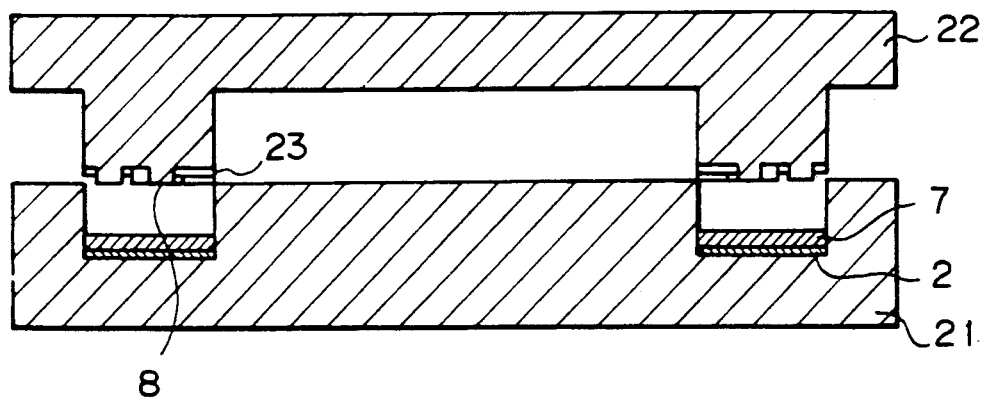

FIG. 14 is a partially sectional view of a mold used for production of the clutch driven plate shown in FIG. 11.

DESCRIPTION OF THE PREFERRED EMBODIMENTS

Figure 1:
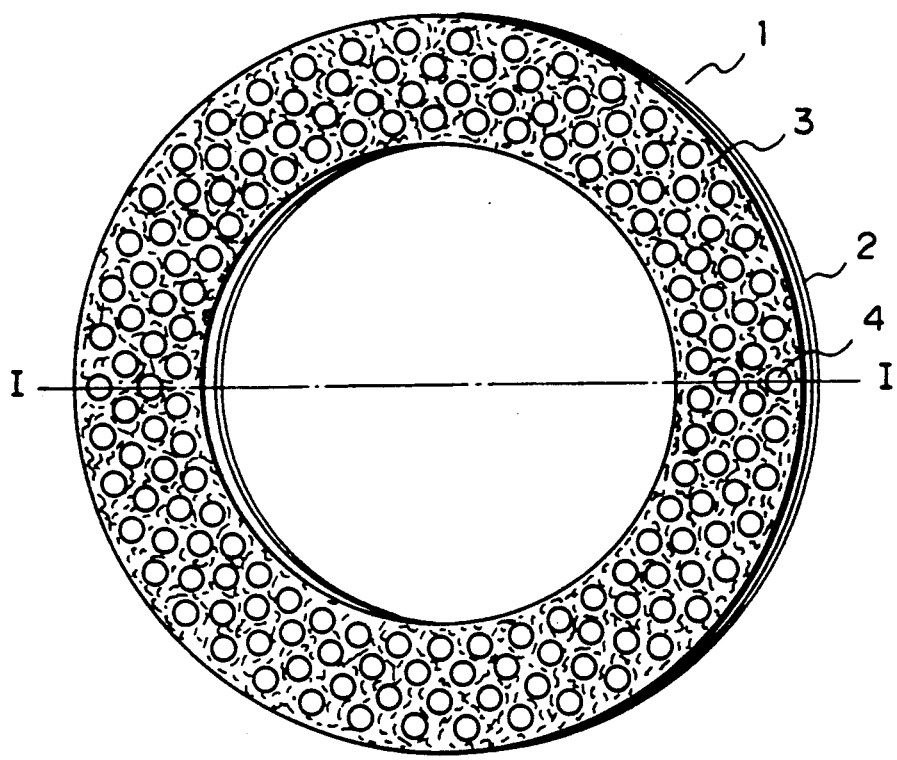
FIG. 1 is a perspective view of an embodiment of the clutch driven plate according to the present invention.

FIG. 1 is a perspective view of an embodiment of the clutch driven plate according to the present invention, and the clutch driven plate shown in FIG. 1 consists of a back-up plate 2 and a clutch facing plate 3 molded from a clutch facing material comprising a fiber, a binder, and a friction modifier and fixed onto the back-up plate 2, and a number of dimples 4 are formed on the surface of the clutch facing plate 3.

The back-up plate to be used in the present invention has a ring form and is constructed from a metal plate or metal wire of steel, copper, aluminum, aluminum alloys including dulalumin, magnesium, etc., woven fabric, or the like. It is preferable to use a ring made of a light metal having a gravity of not more than 5, for example, aluminum, aluminum alloys including dulalumin, and magnesium. Aluminum alloys are particularly preferably used. Also, considering application of an adhesive, such as phenol adhesives or nitrile adhesives, on the surface of the back-up plate to be fixed with the clutch facing plate, it is preferable to use a back-up plate with a surface roughened by shot blasting, buffing, chemical polishing, or the like.

The clutch facing plate to be used in the present invention may be produced by molding a clutch facing material comprising a fiber, a binder, and a friction modifier.

The fiber to be used in the present invention may be any one generally used for friction materials, and some illustrative examples of the fiber to be used in the present invention include asbestos, glass fiber, aramid fiber, carbon fiber, ceramic fiber, metal fiber, rayon (staple) fiber, and polyacrylic fiber. The preferred fibers are those of bulked type or short fiber of 10 mm or less in length.

The binder to be used in the present invention may be any one generally used for friction material, and some illustrative examples of the binder include thermosetting resins, such as melamine resins and phenol resins, and rubber binders, such as NBR and SBK.

The friction modifier to be used in the present invention may be any one generally used for friction material, and some illustrative examples of the friction modifier include cashew dust, friction dust, graphite, barium sulfate, clay, calcium carbonate, aluminum powder, copper powder, zinc power, lead sulfide, alumina, and antimony trioxide.

The clutch facing material preferably comprises 30 to 50 parts by weight of the fiber, 20 to 40 parts by weight of the binder, and 10 to 40 parts by weight of the friction modifier.

With regard to the dimples formed on the surface of the clutch facing plate, the preferred total area of the openings of the dimples is equal to or smaller than the area of the surface of the clutch driven plate exclusive of the openings of the dimples. A total area of the openings larger than the above-described range makes the space between dimples narrow and tends to cause cracks in the clutch facing plate between dimples. In addition, the smaller the residuary surface is, the sooner the clutch facing plate wears out. The preferred volume percentage of the total volume of the dimples in the clutch facing plate is not less than 20% of the volume of a clutch facing plate without dimple. If the total volume of the dimples is less than 20%, the lightening effect may become insufficient. Each dimple is preferably so distributed as to be spaced equally in the circumferential direction on the surface of the clutch facing plate.

The openings of the dimples may have any form, for example, a triangle, a square, an ellipse, a circle, or a hexagon. Considering the easiness in formation of the dimples, the preferred form is a circle.

In the method of producing a clutch driven plate of the present invention, it is desirable to employ a condition of a molding temperature of 80° to 300° C., preferably 150° to 180° C., and a pressure of 50 to 1,000 kg/cm², preferably 200 to 600 kg/cm², for thermo-compression molding the back-up plate and the clutch facing material into an integral body.

After the thermo-compression molding, the obtained laminate consisting of a back-up plate and a clutch facing plate is cured and aged by heat-treatment at 150° to 400° C. Thereafter, the surface of the clutch facing plate is ground to obtain a clutch driven plate having the required thickness, and the obtained clutch driven plate is finished by making rivet holes.

Formation of dimples may be carried out after the thermo-compression molding by using a drilling machine. However, it is preferable to carry out formation of dimples at the time of thermo-compression molding. For example, in an embodiment of the method of the present invention, formation of dimples and thermo-compression molding is carried out simultaneously by putting a back-up plate in a female mold having a flat bottom, putting a clutch facing material comprising a fiber, a binder, and a friction modifier on the back-up plate so as to form two layers consisting of a lower layer of the back-up plate and an upper layer of the clutch facing material layer, and molding the layered back-up plate and clutch facing material into an integral body by thermo-compression molding utilizing a force mold having a number of projections on its surface so as to form a number of dimples on the surface of the molded clutch facing plate.

When formation of the dimples is performed by using a mold having a number of projections as described above, the preferred form of the projections is a cylindrical form which makes the opening of dimples circular. A cylindrical projection pushes away the clutch facing material almost uniformly and reduces the irregularity of the material. It is also preferable to form dimples each having a dimple diameter of from $\phi 2$ mm to $\phi 15$ mm. If the dimple diameter is more than $\phi 15$ mm, the clutch facing material may not efficiently pushed away. If the dimple diameter is less than $\phi 2$ mm, the total area of the side surfaces of the dimples will become too large causing sticking in the mold.

Figure 2:
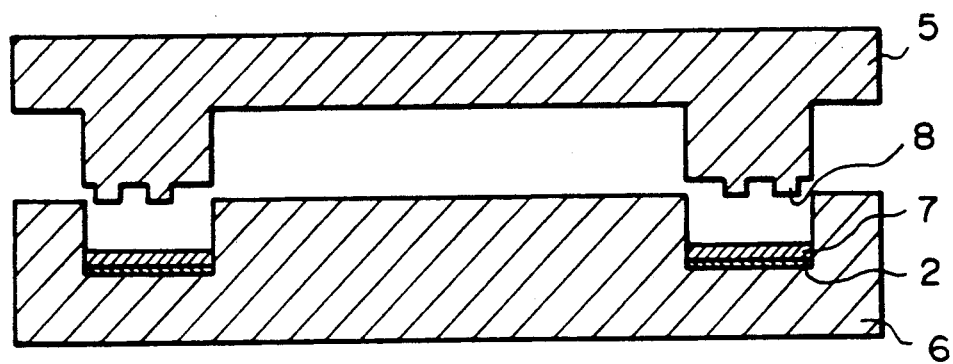
FIG. 2 is a partially sectional view of a mold used for an embodiment of the method of producing a clutch driven plate according to the present invention on a line corresponding to the line I—I of FIG. 1.

In the method shown in FIG. 2, integration of back-up plate 2 and clutch facing plate 3 and formation of dimples are performed simultaneously by putting a back-up plate 2 into a ring-like female mold 6, putting a clutch facing material 7 comprising a fiber, a binder, and a friction modifier on the back-up plate 2, and then thermo-compression molding them by pressing them down with a force mold 5 having a number of projections on its surface. Because, in this method, dimples are formed at the time of thermo-compression molding, the number of processing steps can be reduced, and the degree of warp can also be reduced more than the case dimples are formed after thermo-compression molding.

Because, in the above-described method, a number of dimples are formed in the surface of the clutch facing plate at the time of thermo-compression molding, the stress generated by the difference in heat expansion coefficient between the back-up plate and the clutch facing plate becomes smaller at the regions of the dimples, and the degree of warp is reduced accordingly. Also, because the apparent elastic modulus of the clutch facing plate is as well reduced more than the clutch facing plate having no dimple, the stress is more reduced, and the warp is further decreased. Further, because the weight of the clutch facing plate according to the present invention is reduced by the weight corresponding to the volume of the dimples, the obtained clutch driven plate is lightened, and therefore, the moment of inertia of the clutch facing plate applied on the back-up plate is reduced resulting in an improved burst strength of the clutch driven plate.

When integral molding of back-up plate and clutch facing plate and formation of dimples are performed simultaneously by the thermo-compression molding using a mold having projections, it is desirable to use a mold which has cylindrical projections each having a rounded top.

If the top of the cylindrical projection is not rounded, a larger amount of clutch facing material tends to remain under a dimple, i.e. between the cylindrical projection and the back-up plate, because of the low flowability of the clutch facing material, and the lightening effect may become insufficient. Additionally, the density of the whole clutch facing plate will become low, and the clutch facing plate may gets fragile resulting in an insufficient strength of the clutch driven plate. Also, the flagility may make the clutch facing plate apt to crack at the time of removal of mold after thermo-compression molding.

FIG. 3 is a partially sectional view of an example of the force mold having cylindrical projections with rounded tops. It is particularly preferable to use a mold in which each cylindrical projection is tapered and has a rounded top as shown in FIG. 4.

In order to simplify the process of making rivet holes, it is further preferable to use a mold provided with additional cylindrical projections for forming depressions in the clutch facing plate at the parts corresponding to the rivet holes.

When dimples are formed on the surface of the clutch facing plate by means of cylindrical projections with rounded tops, the clutch facing material can be easily pressed away from the gaps between the back-up plate and the cylindrical projections, and both the decrease in the density of the clutch facing plate after molding and the cracking of the clutch facing plate at the time of removal of the mold can be prevented. In case the cylindrical projections with rounded tops have been tapered, the density of the clutch facing plate beside the side faces of the cylindrical projections can be further increased as the cylindrical projections are pressed in. Also, at the time of removal of the mold, the shearing force generated between the cylindrical projections and the clutch facing plate on the side faces of the projections will be decreased, and the clutch facing plate can be prevented from cracking.

Alternatively, the above-described inconvenience can also be dissolved by employing a method wherein the production of the integral body consisting of a clutch facing plate and a back-up plate and the formation of the dimples are carried out by preforming the clutch facing material so as to form a number of dimples on the surface of the clutch facing material layer, which is to be the surface of the clutch facing plate, before or after making two layers with the back-up plate and the clutch facing material and subsequently, thermo-compression molding the two layers consisting of the back-up plate layer and the clutch facing material layer provided with the dimples to mold the two layers into an integral body.

An embodiment of the method comprises putting a clutch facing material comprising a fiber, a binder, and a friction modifier in a female mold having a number of cylindrical projections, preforming the clutch facing material so as to form a number of dimples on the lower surface of the clutch facing material, putting a back-up plate on the upper surface of the preformed clutch facing material, and thermo-compression forming the back-up plate layer and the preformed clutch facing material layer by clamping a force mold to integrate the two layers.

This embodiment of the method will be described referring to FIG. 5 and FIG. 6.

As shown in FIG. 5, a clutch facing material 7 is put in a female mold with cylindrical projections (12, 10, 11) followed by clamping at room temperature and at a pressure of preferably 50 to 1,000 kg/cm$^2$, more preferably 200 to 600 kg/cm$^2$ to form the dimple portions, and subsequently, as shown in FIG. 6, a back-up plate 3 is put on the clutch facing material 7 followed by clamping preferably at a temperature of 80° to 300° C., and at a pressure of 50 to 1,000 kg/cm$^2$.

In another embodiment of this method, a force mold provided with a number of pins slidable upwardly and downwardly through it is used and the production of the integral body consisting of a clutch facing plate and a back-up plate and the formation of the dimples are carried out by putting a back-up plate in a female mold, putting a clutch facing material comprising a fiber, a binder, and a friction modifier on the back-up plate, pressing the pins of the force mold in the clutch facing material to form a number of dimples on the surface of the clutch facing material, and thermo-compression molding the back-up plate and the clutch facing material provided with the dimples to mold them into an integral body by clamping the force mold with the pins remaining pressed in the clutch facing material.

FIG. 7 and FIG. 8 show an example of the mold suitably used for this production method.

The mold (13, 14, 15) shown in FIG. 7 is provided with slidable pins 18. At first, a back-up plate 2 is put in the female mold 15, and a clutch facing material 7 is then put on the back-up plate 2 evenly. Subsequently, pins 18 are pressed in the clutch facing material 7 preferably under a condition of a temperature of 80° to 300° C. and at a pressure of 200 to 1,500 kg/cm², and, as shown in FIG. 8, the whole mold is then clamped preferably under the condition of a temperature of 80° to 300° C. and at a pressure of 50 to 1,000 kg/cm² to thermo-compression mold an integral clutch driven plate. This method is desirable because it permits a clutch facing material to be put in a mold uniformly in the circumferential direction without being obstructed by cylindrical projections.

Because, according to the above-described method, thermo-compression molding of a clutch driven plate by clamping is carried out after the dimples have previously been formed on the surface of the clutch facing material, only a small amount of clutch facing material remains under the dimples, and a light clutch driven plate can be obtained. Further, because in this method, the molded clutch facing plate has a high density, cracking or breakage of the clutch facing plate at the time of removal of molds after thermo-compression molding can be prevented.

It is preferably to provide the clutch driven plate of the present invention with air inlet pores, each of the air inlet pores running through the clutch driven plate from the surface of the back-up plate to the bottom of each dimple respectively and having a smaller opening area than the dimples.

FIG. 9 and FIG. 10 show an embodiment of the clutch driven plate according to the present invention, FIG. 9 being a front view of the clutch driven plate and FIG. 10 being a sectional view on the line I—I of FIG. 9. This clutch driven plate 1 is provided with air inlet pores 19, each of the air inlet pores 19 running through the clutch driven plate 1 from the surface of the back-up plate 2 to the bottom of each dimple 4 in the clutch facing plate 3 respectively. When dimples are formed in a clutch facing plate, a negative pressure generates in the dimples at the time the clutch is disengaged during a high speed rotation, and disengagement of clutch may sometimes become uneasy. The air inlet pores as shown in FIG. 9 and FIG. 10 prevent generation of the negative pressure in the dimples even when a clutch is disengaged during a high speed rotation, and a clutch driven plate having such air inlet pores can be properly disengaged. The opening area of each air inlet pore is smaller than that of each dimple, and is preferably 0.5 to 3 mm in diameter.

Production of the air inlet pores may be carried out by using a drilling machine or the like.

The uneasiness on disengagement due to the negative pressure generated in the dimples can also be prevented by providing the surface of the clutch facing plate with at least one groove having a width smaller than the maximum width of the opening of each dimple, so that at least one of the both ends of the groove reaches the outward peripheral edge or inward peripheral edge of the clutch facing plate and each dimple is crossed through by the groove on the surface of the clutch facing plate.

FIG. 11, FIG. 12, and FIG. 13 show an embodiment of the clutch driven plate according to the present invention, the clutch driven plate having a number of air inlet grooves. FIG. 11 is a front view of the clutch driven plate, FIG. 12 is a sectional view on the line III—III of FIG. 11, and FIG. 13 is a partially sectional view on the line IV—IV of FIG. 11. In the clutch driven plate 1, a number of air inlet grooves 20 are formed on the surface of the clutch facing plate 3, each air inlet groove 20 reaching the outward and inward peripheral edges of the clutch facing plate 3 and crossing through four dimples 4 on the surface of the clutch facing plate 3 respectively. The width of each air inlet groove 20 is smaller than the maximum width of the opening of each dimple 4. Alike the above-described air inlet pores, the air inlet grooves 20 function so as to prevent generation of negative pressure in the dimples 4. That is, each groove reaches the outward and inward peripheral edges of the clutch facing plate 3 so that the dimples can be ventilated with the outside air and therefore, generation of negative pressure can be prevented.

In case the clutch driven plate provided with dimples and air inlet grooves is produced by thermo-compression molding, it is suitable, for performing the thermo-compression molding and the formation of dimples and air inlet grooves simultaneously, to use a mold as shown in FIG. 14 which comprises a mold 22 having cylindrical projections 8 and streak-like projections 23 for forming respectively the air inlet grooves 20 and dimples 4 as shown in FIG. 11. Alternatively, it is also possible to form the dimples and the air inlet grooves separately by using a drilling machine and a shaping machine respectively, after thermo-compression molding.

The deeper the depth of the air inlet groove, the better, and it is preferable to restrict the maximum width of the air inlet groove to about 3 mm because the friction surface has already been reduced by the provision of the dimples.

Hereinafter, the present invention will be described in more detail by examples, but it is intended the examples be construed illustrative rather than limiting the present invention.

EXAMPLES 1 TO 8

EXAMPLE 1

A clutch driven plate having a form as shown in FIG. 1 was produced. The clutch driven plate produced in this example had a ring form of 130 mm in internal diameter, 200 mm in external diameter, and 3.5 mm in thickness and consisted of a back-up plate 2 made of an aluminum alloy and a clutch facing plate 3 with a number of dimples 4. The clutch driven plate was produced by putting a clutch facing material consisting of a fiber, a binder, and a friction modifier on a back-up plate 2 made of an aluminum alloy, and thermo-compression molding them simultaneously with formation of a number of dimples 4. The clutch driven plate is to be used by riveting it to both sides of a cushion spring of a dry clutch (not illustrated) with the surface of the back-up plate 2 facing a disc.

The method employed for production of the clutch driven plate will be described hereinafter referring to FIG. 1 and FIG. 2.

At first a back-up plate 2 was produced. A back-up plate 2 was punched out into the above-described ring form from an aluminum alloy plate (ALP 5052 H34) of 1 mm in thickness by using a punching press. The surface of the back-up plate 2 to be fixed to the clutch facing plate 3 was roughened by abrasion treatment and then washed with an alkali degreasing agent. Subsequently, to the surface applied was a phenol resin adhesive, and the back-up plate 2 was then put in the mold 6 as shown in FIG. 2 with the applied surface looking upward.

A clutch facing plate 3 was then formed. 30 parts by weight of a glass short fiber (fiber length: 5 mm) and 10 parts by weight of a bulked aramid fiber as the fiber, 30 parts by weight of a melamine resin and 10 parts by weight of NBR and a vulcanizing agent therefor as the binder, and 15 parts by weight of cashew dust and 5 parts by weight of barium sulfate as the friction modifier were mixed by using a Henschel mixer to prepare a clutch facing material 7.

58 g of the prepared clutch facing material 7 was put in a mold 6 as shown in FIG. 2. Thus, the clutch facing material 7 was placed on the upper surface of the back-up plate 2. In this state, thermo-compression molding was carried out by clamping the force mold 5 under the condition of a temperature of 150° C. and a surface pressure of 600 kg/cm$^2$.

Since a number of cylindrical projections 8 as shown in FIG. 2 had been provided on the surface of the force mold 5, a number of dimples 4 were formed on the surface of the molded clutch facing plate 3. The obtained laminate was then heat treated at 200° C., to cure and age the clutch facing plate 3. Thus obtained laminate consisted of a back-up plate 2 of 1 mm in thickness and a clutch facing plate 3 of 3.5 mm in thickness (dimple diameter: φ7 mm, dimple depth: 3.0 mm).

Further, the surface of the clutch facing plate 3 was ground to obtain a clutch driven plate 1 of 3.5 mm in thickness. The obtained clutch driven plate 1 consisted of a back-up plate 2 of 1 mm in thickness and a clutch facing plate 3 of 2.5 mm in thickness (dimple diameter: φ7 mm, dimple depth: 2.0 mm, total area of the openings of dimples: 65 cm$^2$ (36% of the area of the surface of the clutch facing plate including the openings of dimples.)).

The obtained clutch driven plate warped only slightly, and was so light as 91.6 g. The density of the clutch facing plate was 1.32 g/cm$^3$.

When a clutch driven plate having no dimple was produced in the same manner as described above with the exception that a mold having no projection was used, the obtained clutch driven plate weighed 112 g.

EXAMPLE 2

A clutch driven plate having a form as shown in FIG. 1 was produced. The clutch driven plate produced in this example had a ring form of 130 mm in internal diameter, 200 mm in external diameter, and 3.5 mm in thickness and consisted of a back-up plate 2 made of an aluminum alloy and a clutch facing plate 3 with a number of dimples 4. The clutch driven plate was produced by putting a clutch facing material consisting of a fiber, a binder, and a friction modifier on a back-up plate 2 made of an aluminum alloy, and thermo-compression molding them simultaneously with formation of a number of dimples 4. The clutch driven plate is to be used by riveting it to both sides of a cushion spring of a dry clutch (not illustrated) with the surface of the back-up plate 2 facing cushion springs.

The method employed for production of the clutch driven plate will be described hereinafter referring to FIG. 1, FIG. 2, and FIG. 3.

At first a back-up plate 2 was produced. A back-up plate 2 was punched out into the above-described ring form from an aluminum alloy plate (ALP 5052 H34) of 1 mm in thickness by using a punching press. The surface of the back-up plate 2 to be fixed to the clutch facing plate 3 was washed with methanol and was then roughened by abrasion treatment. Subsequently, to the surface applied was a phenol resin adhesive, and the back-up plate 2 was put in the mold 6 as shown in FIG. 2 with the applied surface looking upward.

A clutch facing plate 3 was then formed. 30 parts by weight of a glass short fiber (fiber length: 5 mm) and 10 parts by weight of a bulked aramid fiber as the fiber, 30 parts by weight of a melamine resin and 10 parts by weight of NBR and a vulcanizing agent therefor as the binder, and 15 parts by weight of cashew dust and 5 parts by weight of barium sulfate as the friction modifier were mixed by using a Henschel mixer to prepare a clutch facing material 7.

58 g of the prepared clutch facing material 7 was uniformly put in a female mold 6 as shown in FIG. 2. Thus, the clutch facing material 7 was placed on the upper surface of the back-up plate 2.

In this state, thermo-compression molding was carried out by clamping the force mold 5, which had a number of cylindrical projections with rounded (R: 1 mm) edges of tops as shown in FIG. 3, under the condition of a temperature of 150° C. and a surface pressure of 200 kg/cm$^2$. The obtained laminate was then heat treated at 200° C., to cure and age the clutch facing plate 3. The obtained laminate consisted of a back-up plate 2 of 1 mm in thickness and a clutch facing plate 3 of 3.2 mm in thickness (dimple diameter: φ7 mm, dimple depth: 3.0 mm).

Further, the surface of the clutch facing plate 3 was ground to obtain a clutch driven plate 1 of 3.5 mm in thickness, and rivet holes were made by using a drilling machine. The obtained clutch driven plate 1 consisted of a back-up plate 2 of 1 mm in thickness and a clutch facing plate 3 of 2.5 mm in thickness (dimple diameter: φ7 mm, dimple depth: 2.3 mm, total area of the openings of dimples: 65 cm$^2$ (36% of the area of the surface of the clutch facing plate including the openings of dimples.)).

The clutch facing material flowed out smoothly from the spaces between the cylindrical projections 8 and the back-up plate 2, and the obtained clutch driven plate had a clutch facing plate having a high density (1.40 g/cm$^3$). The total weight of the obtained clutch driven plate was 94.6 g.

EXAMPLE 3

A clutch driven plate was produced in the same manner as in Example 2 with the exception that the force mold 5 was replaced with a force mold which had a number of cylindrical projections not only rounded but also tapered as shown in FIG. 4. Such a mold was easily removed, and the obtained clutch driven plate had a high density (1.40 g/cm$^3$), and was free from cracks or breakage.

EXAMPLE 4

A clutch driven plate having a form as shown in FIG. 1 was produced. The clutch driven plate produced in this example had a ring form of 130 mm in internal diameter, 200 mm in external diameter, and 3.5 mm in thickness and consisted of a back-up plate 2 made of an aluminum alloy and a clutch facing plate 3 with a number of dimples 4. The clutch driven plate was produced by putting a clutch facing material consisting of a fiber, a binder, and a friction modifier on a back-up plate 2 made of an aluminum alloy, and thermo-compression molding them into one body. The clutch driven plate is to be used by riveting it to both sides of a cushion spring of a dry clutch (not illustrated) with the surface of the back-up plate 2 facing a disc.

The method employed for production of the clutch driven plate will be described hereinafter referring to FIG. 1, FIG. 5, and FIG. 6.

At first a back-up plate 2 was produced. A back-up plate 2 was punched out into the above-described ring form from an aluminum alloy plate (ALP 5052 H34) of 1 mm in thickness by using a punching press. The surface of the back-up plate 2 to be fixed to the clutch facing plate 3 was washed with methanol and was then roughened by abrasion treatment. Subsequently, to the surface applied was a phenol resin adhesive.

A clutch facing plate 3 was then formed. 30 parts by weight of a glass short fiber (fiber length: 5 mm) and 10 parts by weight of a bulked aramid fiber as the fiber, 30 parts by weight of a melamine resin and 10 parts by weight of NBR and a vulcanizing agent therefor as the binder, and 15 parts by weight of cashew dust and 5 parts by weight of barium sulfate as the friction modifier were mixed by using a Henschel mixer to prepare a clutch facing material 7.

54 g of the prepared clutch facing material 7 was put in a female mold (10, 11, 12) as shown in FIG. 5, the female mold having cylindrical projections for forming dimples, and the mold was clamped for a several seconds at room temperature and at a surface pressure of 200 kg/cm$^2$ to form dimples.

Subsequently, the above-described back-up plate 2 was placed on the preformed clutch facing material 7, and the force mold 9 was clamped at 150° C. and at a surface pressure of 600 kg/cm$^2$ to perform thermo-compression molding. The obtained laminate was then heat treated at 200° C., to cure and age the clutch facing plate 3. The obtained laminate consisted of a back-up plate 2 of 1 mm in thickness and a clutch facing plate 3 of 3.2 mm in thickness (dimple diameter: $\phi$7 mm, dimple depth: 3.0 mm).

Further, the surface of the clutch facing plate 3 was ground to obtain a clutch driven plate 1 of 3.5 mm in thickness, and rivet holes were made by using a drilling machine. The obtained clutch driven plate 1 consisted of a back-up plate 2 of 1 mm in thickness and a clutch facing plate 3 of 2.5 mm in thickness (dimple diameter: $\phi$7 mm, dimple depth: 2.3 mm, total area of the openings of dimples: 65 cm$^2$ (36% of the area of the surface of the clutch facing plate including the openings of dimples.)).

In the obtained clutch driven plate, only a small amount of the clutch facing material remained under the dimples, and the density of the clutch facing plate was so high as 1.40 g/cm$^3$. The total weight of the clutch driven plate was 91.4 g.

EXAMPLE 5

A clutch driven plate having a form as shown in FIG. 1 was produced by using the same back-up plate and clutch facing material as used in Example 4 and using a mold as shown in FIG. 7 and FIG. 8 which had been provided with a number of pins 18 ($\phi$7 mm) slidable upwardly and downwardly.

The back-up plate 2 was put in a female mold 15, and 58 g of the clutch facing material 7 was placed on the back-up plate 2 to form a ring with a uniform thickness. The slidable pins of the mold were pressed in the clutch facing material at 150° C. and at a surface pressure of the top surface of the pins of 1,200 kg/cm$^2$, and were kept as they were for 15 seconds, to form dimples. The pressing bed plates 16 and 17 were then placed into position as shown in FIG. 8, and the mold was then clamped at 150° C. and at a surface pressure of 600 kg/cm$^2$ to perform thermo-compression molding.

After removal of the mold, the obtained laminate was cured and aged by heat-treating it at 200° C. The obtained laminate consisted of a back-up plate 2 of 1 mm in thickness and a clutch facing plate 3 of 3.2 mm in thickness (dimple diameter: $\phi$7 mm, dimple depth: 3.0 mm).

Further, the surface of the clutch facing plate 3 was ground to obtain a clutch driven plate 1 of 3.5 mm in thickness, and rivet holes were made by using a drilling machine. The obtained clutch driven plate 1 consisted of a back-up plate 2 of 1 mm in thickness and a clutch facing plate 3 of 2.5 mm in thickness (dimple diameter: $\phi$7 mm, dimple depth: 2.3 mm, total area of the openings of dimples: 65 cm$^2$ (36% of the area of the surface of the clutch facing plate including the openings of dimples.)).

In the clutch driven plate thus produced, the scattering of the density of the clutch facing plate in the circumferential direction was reduced because the clutch facing material could be uniformly put in the mold, and the clutch facing plate had a high density (1.40 g/cm$^3$). The total weight of the clutch driven plate was 91.4 g.

EXAMPLE 6

A clutch driven plate having a form as shown in FIG. 9 and FIG. 10 was produced. FIG. 9 is a front view of the clutch driven plate produced in this Example, and FIG. 10 is a sectional view on the line I—I of FIG. 9.

The clutch driven plate produced in this Example had a ring form of 130 mm in internal diameter, 200 mm in external diameter, and 3.5 mm in thickness, consisted of a back-up plate 2 made of an aluminum alloy and a clutch facing plate 3 with a number of dimples 4, and was provided with air inlet pores each of which runs through from the surface of the back-up plate 2 to the bottom of each dimple. The clutch driven plate was produced by putting a clutch facing material consisting of a fiber, a binder, and a friction modifier on a back-up plate 2 made of an aluminum alloy, thermo-compression molding them simultaneously with formation of a number of dimples 4, and making the air inlet pores each of which runs through from the surface of the back-up plate to the bottom of each dimple. The clutch driven plate is to be used by riveting it to both side of a cushion spring of a dry clutch (not illustrated) with the surface of the back-up plate 2 facing a disc.

The method employed for production of the clutch driven plate will be described hereinafter referring to FIG. 9, FIG. 10, and FIG. 2.

At first a back-up plate 2 was produced. A back-up plate 2 was punched out into the above-described ring form from an aluminum alloy plate (ALP 5052 H34) of 1 mm in thickness by using a punching press. A surface of the back-up plate 2 to be fixed to the clutch facing plate 3 was roughened by abrasion treatment and then washed with an alkali degreasing agent. Subsequently, to the surface applied was a phenol resin adhesive, and the back-up plate 2 was put in the female mold 6 as shown in FIG. 2 with the applied surface looking upward.

A clutch facing plate 3 was then formed. 30 parts by weight of a glass short fiber (fiber length: 5 mm) and 10 parts by weight of a bulked aramid fiber as the fiber, 30 parts by weight of a melamine resin and 10 parts by weight of NBR and a vulcanizing agent therefor as the binder, and 15 parts by weight of cashew dust and 5 parts by weight of barium sulfate as the friction modifier were mixed by using a Henschel mixer to prepare a clutch facing material 7.

58 g of the prepared clutch facing material 7 was put in a mold 6 as shown in FIG. 2. Thus, the clutch facing material 7 was placed on the upper surface of the back-up plate 2. In this state, thermo-compression molding was carried out by clamping the force mold 5 under the condition of a temperature of 150° C. and a surface pressure of 600 kg/cm$^2$.

Since a number of cylindrical projections 8 as shown in FIG. 2 had been provided on the surface of the force mold 5, a number of dimples 4 were formed on the surface of the molded clutch facing plate 3. The obtained laminate was then heat treated at 200° C., to cure and age the clutch facing plate 3. The obtained laminate consisted of a back-up plate 2 of 1 mm in thickness and a clutch facing plate 3 of 3.5 mm in thickness (dimple diameter: $\phi$7 mm, dimple depth: 3.0 mm).

Further, a piercing hole of $\phi$1 mm was made at the center of every dimple by using a drilling machine to provide the air inlet holes 19.

Subsequently, the surface of the clutch facing plate 3 was ground to obtain a clutch driven plate 1 of 3.5 mm in thickness. The obtained clutch driven plate 1 consisted of a back-up plate 2 of 1 mm in thickness and a clutch facing plate 3 of 2.5 mm in thickness (dimple diameter: $\phi$7 mm, dimple depth: 2.0 mm, total area of the openings of dimples: 65 cm$^2$ (36% of the area of the surface of the clutch facing plate including the openings, diameter of the air inlet pore: $\phi$1 mm.)).

The obtained clutch driven plate warped only slightly, and there occurred no worsening of disengagement in the clutch fixed with the clutch driven plate. The clutch facing plate had a density of 1.32 g/cm$^3$, and the total weight of the clutch driven plate was 88.2 g.

EXAMPLE 7

A clutch driven plate having a form as shown in FIG. 11, FIG. 12, and FIG. 13 was produced. FIG. 11 is a front view of the clutch driven plate produced in this Example, FIG. 12 is a sectional view on the line II—II of FIG. 11, FIG. 13 is a partially sectional view on the line III—III of FIG. 11.

The clutch driven plate produced in this Example had a ring form of 130 mm in internal diameter, 200 mm in external diameter, and 3.5 mm in thickness, consisted of a back-up plate 2 made of an aluminum alloy and a clutch facing plate 3 with a number of dimples 4, and was provided with air inlet grooves, 20 each of which reached the outward and inward peripheral edges of the clutch facing plate and crossed through four dimples. The clutch driven plate was produced by putting a clutch facing material consisting of a fiber, a binder, and a friction modifier on a back-up plate 2 made of an aluminum alloy, and thermo-compression molding them simultaneously with formation of a number of dimples 4 and air inlet grooves 20. The clutch driven plate is to be used by riveting it to both sides of a cushion spring of a dry clutch (not illustrated) with the surface of the back-up plate 2 facing a disc.

The method employed for production of the clutch driven plate will be described hereinafter referring to FIG. 11, FIG. 12, FIG. 13 and FIG. 14.

At first a back-up plate 2 was produced. A back-up plate 2 was punched out into the above-described ring form from an aluminum alloy plate (ALP 5052 H34) of 1 mm in thickness by using a punching press. The surface of the back-up plate 2 to be fixed to the clutch facing plate 3 was roughened by abrasion treatment and then washed with an alkali degreasing agent. Subsequently, to the surface applied was a phenol resin adhesive, and the back-up plate 2 was put in the female mold 21 as shown in FIG. 14 with the applied surface looking upward.

A clutch facing plate 3 was then formed. 30 parts by weight of a glass short fiber (fiber length: 5 mm) and 10 parts by weight of a bulked aramid fiber as the fiber, 30 parts by weight of a melamine resin and 10 parts by weight of NBR and a vulcanizing agent therefor as the binder, and 15 parts by weight of cashew dust and 5 parts by weight of barium sulfate as the friction modifier were mixed by using a Henschel mixer to prepare a clutch facing material 7.

56 g of the prepared clutch facing material 7 was put in a mold 21 as shown in FIG. 14. Thus, the clutch facing material 7 was placed on the upper surface of the back-up plate 2. In this state, thermo-compression molding was carried out by clamping the force mold 22 under the condition of a temperature of 150° C. and a surface pressure of 600 kg/cm$^2$.

Since the surface of the force mold 22 had been provided with a number of cylindrical projections 8 and streak-like projections 23 as shown in FIG. 14, on the surface of the molded clutch facing plate 3 formed were a number of dimples 4 and a number of air inlet grooves 20, each of which reached the inward and outward peripheral edges of the clutch facing plate and crossed through four dimples. The obtained laminate was then heat treated at 200° C., to cure and age the clutch facing plate 3. The obtained laminate consisted of a back-up plate 2 of 1 mm in thickness and a clutch facing plate 3 of 3.5 mm in thickness (dimple's diameter: $\phi$7 mm, dimple's depth: 3.0 mm, width of air inlet groove: 1 mm, depth of the air inlet groove: 2.7 mm).

Subsequently, the surface of the clutch facing plate 3 was ground to obtain a clutch driven plate 1 of 3.5 mm in thickness. The obtained clutch driven plate 1 consisted of a back-up plate 2 of 1 mm in thickness and a clutch facing plate 3 of 2.5 mm in thickness (dimple diameter: $\phi$7 mm, dimple depth: 2.0 mm, total area of the openings of dimples: 65 cm$^2$ (36% of the area of the surface of the clutch facing plate including the openings of dimples, width of air inlet groove: 1 mm, depth of air inlet groove: 1.7 mm)).

The obtained clutch driven plate warped only slightly, and there occurred no worsening of disengagement in the clutch fixed with the clutch driven plate.

The clutch facing plate had a density of 1.32 g/cm³, and the total weight of the clutch driven plate was 90.7 g.

EXAMPLE 8

A clutch facing plate having a form as shown in FIG. 1 was produced in the same manner as in Example 1.

The obtained clutch driven plate 1 consisted of a back-up plate of 1 mm in thickness and a clutch facing plate of 2.5 mm in thickness (dimple's diameter: ϕ7.6 mm, dimple's depth: 2.5 mm, total area of the openings of dimples: 72.6 cm² (40% of the area of the surface of the clutch facing plate including the openings).

The obtained clutch driven plate warped only slightly. The clutch facing plate had a density of 1.4 g/cm³, and the total weight of the clutch driven plate was 90.0 g.

What is claimed is:

1. A method of producing a clutch driven plate, comprising:

putting a back-up plate in a female mold which forms a counterpart to a force mold provided with a number of pins slidable upwardly and downwardly through the force mold, putting a clutch facing material comprising a fiber, a binder, and a friction modifier on the back-up plate, pressing the slidable pins of the force mold downwardly into the clutch facing material to form a number of dimples on the surface of the clutch facing material, and clamping the force mold, with the sliable pins remaining pressed into the clutch facing material, to thermo-compression mold the back-up plate and the clutch facing material provided with the dimples, thereby producing an integral body consisting of the back-up plate and a clutch facing plate which has a surface provided with a number of dimples.

2. The method of producing a clutch driven plate as claimed in claim 1, wherein each dimple provided on the surface of the clutch facing plate has a circular opening of ϕ2 mm to ϕ15 mm in diameter, the total area of the openings of the dimples is equal to or smaller than the area of the surface of the clutch driven plate exclusive of the openings of the dimples, the volume percentage of the total volume of the dimples in the clutch facing plate is not less than 20% of the volume of the clutch facing plate without dimple, and each dimple is so distributed as to be spaced equally in the circumferential direction on the surface of the clutch facing plate.

3. A method of producing a clutch driven plate as claimed in claim 1, wherein each of the pins provided in the force mold is a cylindrical pin having a rounded lower end.

4. The method of producing a clutch driven plate as claimed in claim 1, wherein each of the pins provided in the force mold is a cylindrical pin having a tapered lower end.

* * * * *